United States Patent
Britland et al.

[11] 3,781,530
[45] Dec. 25, 1973

[54] NAVIGATIONAL APPARATUS

[75] Inventors: Colin Morris Britland, Bagshot; John Bernard Joseph Thorpe, Ash, both of England

[73] Assignee: The Secretary of State for Defense in Her Britannic Majesty's Government of the United Kingdom of Great Britain and Northern Ireland, London, England

[22] Filed: Apr. 3, 1972

[21] Appl. No.: 240,406

[52] U.S. Cl.......... 235/150.26, 343/5 DP, 343/5 W, 343/7 TA, 343/112 CA
[51] Int. Cl. .............................................. G06f 15/50
[58] Field of Search.................. 235/150.23, 150.26; 343/5 DP, 5 W, 7 TA, 112 CA; 444/1

[56] References Cited
UNITED STATES PATENTS

| | | | |
|---|---|---|---|
| 3,359,557 | 12/1967 | Fow et al. | 343/5 W |
| 3,310,806 | 3/1967 | Stansbury | 235/150.23 X |

*Primary Examiner*—Malcolm A. Morrison
*Assistant Examiner*—R. Stephen Dildine, Jr.
*Attorney*—Moore & Hall

[57] ABSTRACT

Navigational apparatus comprises a primary hazard sensor, for example a weather radar, for providing signals representing the distribution of hazards ahead of a moving vehicle, connected to a computer. The computer is programmed to compute at least one path substantially avoiding the hazards. An indicator may be connected to an output of the computer to display the paths computed in relation to the hazards. The vehicle guidance system may also be controlled by the computer output so that the vehicle follows one of the computed paths. The computer may be programmed to consider a number of possible paths through a given hazard distribution and to select advantageous paths from those considered for display together with an indication of the risk and economy of each selected path.

8 Claims, 8 Drawing Figures

NAVIGATIONAL APPARATUS

BACKGROUND OF THE INVENTION

This invention relates to navigational apparatus and in particular to navigational apparatus for providing information for the automatically or manually controlled safe navigation through groups of hazards with minimum detours. In a ship-borne application of the invention these hazards might be land masses, rocks, wrecks, or other moored ships and in an airborne application they might be stormy areas, or, in low level flight, terrestial obstacles.

In known navigational apparatus information from primary sensors such as radar or sonar carried on a vehicle to be controlled is presented visually to a pilot/-helmsman (hereinafter referred to as "the driver") of the vehicle for example on a cathode-ray oscilloscope screen. The information depicted on the screen indicates the real-time presence of hazards and other navigational features in relation to the driver's own vehicle position. With such a presentation the driver can decide the future course, for example the safest and/or the quickest course, for his vehicle and cause it to follow that course by suitable movement of the vehicle's primary controls. The decision process is repeated constantly throughout the voyage and being a subjective process the decisions taken are not always correct and are certainly not always the optimum choice with respect to safety and/or economy. Because of the many other duties that the present day driver has to perform, for example communicating with bases and other vehicles and monitoring an ever increasing number of displays indicating various aspects of the vehicle's performance, the time available to him for this decision process is short. This is especially true for the pilot of a passenger carrying aircraft flying at supersonic speeds in which the decision as to the most advisable flight path, through or around a pattern of hazardous storm centers indicated by the weather radar as being even up to 300Km ahead, must be made extremely rapidly, bearing in mind that with the manoeuvres allowed, consistent with passenger comfort, a lateral displacement of say 30Km from the desired course may have to be initiated some 100–150Km further back.

SUMMARY OF THE INVENTION

It is an object of the present invention to assist the driver by presenting him at suitable time intervals with a simple choice of one or a few preferred paths towards a given destination, with an indication of the degree of hazard or penalty associated with each choice.

According to the present invention navigational apparatus for use in a moving vehicle comprises a hazard indicating apparatus constructed to provide signals representing the location of hazards with respect to the position of the hazard indicating apparatus, and a computer connected to receive the said signals from the hazard indicating apparatus and programmed to compute parameters of at least one path substantially avoiding the hazards and to provide signal outputs representing the computed parameters.

In the present specification the term "vehicle" should be interpreted widely, to mean any apparatus for the transport of goods or people on land or sea or in the air.

For instance the computer may be arranged to compute the parameters of the most economical path involving a negligible risk and the most economical path involving a tolerable risk.

The computer may also be adapted for connection to one or more navigational displays and the signal outputs therefrom may be adapted to indicate on the said displays the parameters of the paths computed or the paths represented thereby.

The computer may also, or alternatively be adapted for connection to the control system of the vehicle and the signal outputs therefrom may be adapted to operate on the system so as to cause the vehicle to follow a selected one of the paths computed.

BRIEF DESCRIPTION OF THE DRAWINGS

An embodiment of the invention will now be described by way of example only and with reference to the accompanying drawings of which.

DESCRIPTION OF THE PREFERRED EMBODIMENTS

Figure 1:
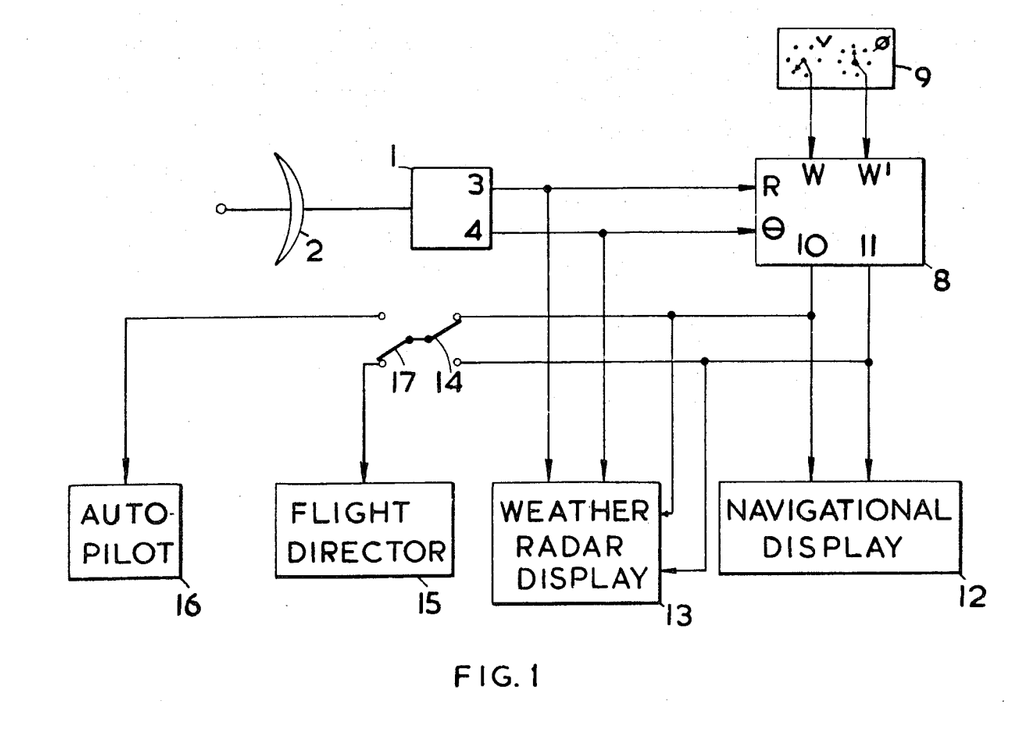
FIG. 1 is a schematic circuit diagram of an airborne storm avoidance navigational apparatus.

In FIG. 1, an airborne storm avoidance navigational apparatus installed in an aircraft (not shown), comprises a weather radar set 1 connected to an antenna 2. The radar set 1 has electrical outputs 3 and 4 connected to supply storm range and bearing signals respectively to two inputs R and $\theta$ of an electronic computer 8. A manually operated windspeed and wind direction selector 9 is connected to two further inputs W and W' of the computer 8. The computer 8 has outputs 10 and 11 each connected to a separate one of two inputs of both a navigational display 12 and a weather radar display 13. Switches 14 and 17 enable one of the outputs 10 or 11 to be further connected to a flight director 15 or to an auto-pilot 16. The weather radar display 13 also receives signals from the outputs 3 and 4 of the radar set 1.

At intervals during the flight of the aircraft an operator sets the windspeed and wind direction selector 9 to the best estimated value of the windspeed and wind direction at the aircraft's height in an azimuthal sector of interest ahead of the aircraft and scanned by the antenna 2. This selection causes a corresponding pair of electrical signals, representing these variables to be fed to the inputs W and W' of the computer 8. Radar signals are transmitted and received by the radar set 1 through the antenna 2. The received signals are processed to produce electrical signals representing the range and bearing of storm centers of intensity greater than a certain (possibly adjustable) intensity, within the sector of interest. These signals are normally fed continuously from the outputs 3 and 4 of the radar set 1 to the weather radar display 13. In the present apparatus sets of these signals representing the storm pattern at a given instant of time are also fed at suitable time intervals to the R and $\theta$ inputs of the computer 8.

Firstly the computer reads the coordinates of the hazards (storm centers) detected by the weather radar 1. These are given by range (R) and bearing ($\theta$) signals relative to the present position and present heading of the aircraft. For convenience of calculation, the computer derives the corresponding cartesian coordinates for the storm centers, relative to a cartesian coordinate system with orthogonal $x$ and $y$ axes, having its origin at the present position of the aircraft. This can be done by a conventional subroutine. It may be desirable to include a correction, dependent on the aircraft's present heading and position relative to the desired track, to incline the y axis of the cartesian coordinate system towards the desired flight direction, even if the aircraft has turned in the course of a detour around some hazard. This correction requires an extra input $\phi_o$ representing the aircraft's present heading relative to the direction of the track, which can be obtained from a conventional direction-finding or navigation apparatus (not shown). The derived cartesian coordinates of the storm centers are stored in a logical order, according to their range from the aircraft.

Figure 2:
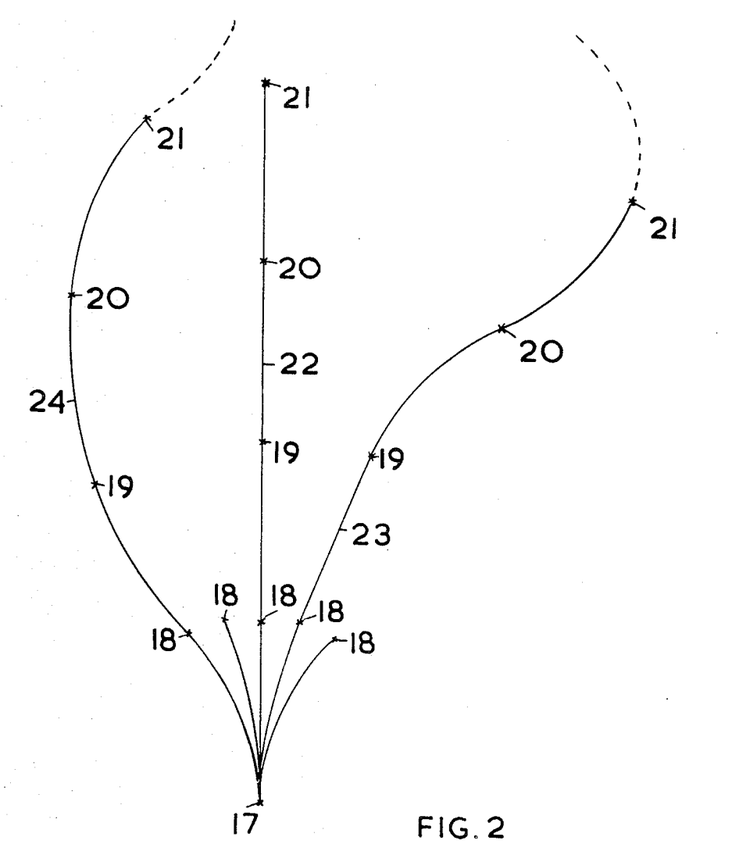
FIG. 2 is a diagrammatic representation of some of the possible flight paths considered by the apparatus of FIG. 1, FIGS. 3, 3a, and 3b comprise a flow chart showing the manner in which the apparatus of FIG. 1 considers the possible paths through a storm pattern and FIGS. 4, 4a, and 4b comprise a flow chart showing the manner in which the apparatus of FIG. 1 considers the possible paths through a storm pattern taking into account the effect of the wind speed and direction in the region of the storms forming that pattern.

The computer 8 is programmed to consider a finite number of possible alternative paths through the storm pattern presented to it at any time, each formed of a predetermined number of successive arcuate segments of equal length. It is assumed that, at the beginning of each segment, any one of a finite predetermined selection of alternative manoeuvres can be begun and maintained until the end of the segment is reached, after which the same range of alternative manoeuvres can again be considered for the following segment. Typically each segment may be flown using any one of the following five possible alternative manoeuvres or arcs:

i. 10° right bank
ii. 5° right bank
iii. substantially straight and level flight
iv. 5° left bank
v. 10° left bank The first step in the path assessment programme examines one out of the five possible arcs starting from the present position of the aircraft, and each subsequent step examines one out of the five possible arcs starting from the end of the preceding arc. Paths of four segments, each involving four successive arcs are considered. Some of the possible flight paths defined by a five choice, four segment path investigation are illustrated in FIG. 2. The points 18 represent the positions that would be arrived at if each of the five alternative manoeuvres of the first segment, starting from the aircraft's present position 17, was followed. The points 19 represent the ends of some of the twenty five possible arcs defining the second segments; points 20 represent the ends of some of the one hundred and twenty five possible arcs defining the third segments; and the points 21 represent some of the ends of the six hundred and twenty five possible arcs defining the fourth segments. For clarity only three of the complete family of possible paths are shown. These are paths 22, 23 and 24. The path 22 consists of four similar straight ahead segments. In path 23 the first segment is covered by a 5° right bank from the starting position 17; the second segment is straight and the third segment is a 10° right bank and the fourth segment is a 10° left bank. In path 24 the first segment is a 5° left bank, the second and third segments are 5° right banks and the fourth segment, is a 10° right bank. The paths 23 and 24 would be completed, in the computation, by appropriate manoeuvres to bring the aircraft back to the desired track. These manoeuvres are shown by broken curves on FIG. 2.

The number of segments considered, and the number of alternative manoeuvres reviewed at the beginning of each segment, are clearly arbitrary. To make the following description more general, the number of segments in each path will be called $s$ and the number of alternative manoeuvres reviewed at each decision will be called $n$. Each path will then be associated with, and defined by, a set of parameters $a_1, a_2, \ldots a_s$ which represent the manoeuvres selected for examination at the beginning of successive segments along the path. In general $a_r$ will represent the manoeuvre selected for examination at the beginning of the rth segment. The parameters $a_r$ will have integral values less than or equal to $n$, and the total number of paths to be considered will be $n^s$. For instance the parameters $a_r$ may have values 1 to 5 corresponding to the choices (i) to (v) hereinbefore listed.

The computer programme is arranged to investigate the possible paths in a logical order; for various reasons some paths may be eliminated from further consideration at an early stage in their consideration; whenever a path is so rejected, or when a path has been fully investigated, the programme turns to a consideration of the next possible path in the logical order, until all possible paths have been either rejected or investigated. Hazard scores, for example related to the proximity of the path to detected storm centers or other hazards, and penalty scores for example indicating the length of any detour involved, the lateral deviation from the desired track or the number of bank reversals, are obtained in the process for each fully investigated path. At the completion of the process the computer selects details of some of the most advantageous paths, for instance the shortest path having a negligible hazard score and the shortest path having a hazard score not greater than a predetermined score which is deemed tolerable. The parameters determining the hazard scores and the penalty scores will in general be defined by the aircraft operators and the air safety authorities. Electrical signals representing these selected paths are then fed from the computer outputs, such as 10 and 11 and may be superimposed on the navigational and weather radar displays 12 and 13. The pilot or operator can then select one of these paths by means of the switches 14 and 17 to show the path to be followed on the flight director 15 for the pilot to steer, or to feed the path directions to the auto-pilot 16 which may then automatically steer the aircraft along that path, when the auto-pilot is allowed to control the aircraft.

The hazard score which will be calculated for any arc under consideration is a numerical quantity which must depend in a chosen predetermined way on the proximity of the arc to the adjacent storm centers. For instance the hazard score may be determined by summing contributions each calculated as a predetermined function of the nearest distance from a given storm center to a point on the arc; each contribution may, for instance, be a linear function of distance from the edge of a forbidden zone, or an inverse function of the shortest radial distance from the storm center, or a function of the distance travelled on parts of the path within a predetermined range from the storm center. The hazard score calculations may take account of any significant effects of the prevailing wind speed and wind direction (as fed into inputs W and W') on the hazard involved in the proximity to a storm, for example any expected downwind turbulence which may not be revealed on the radar display 13.

Specified temporary store locations are allocated to the parameters $a_1, a_2 \ldots a_s$. The programme starts with the parameters $a_1 = a_2 = a_3 = \ldots = a_s = 0$ as shown by Box A of FIG. 3 indicating that no manoeuvre has yet been selected for examination.

Figure 3:
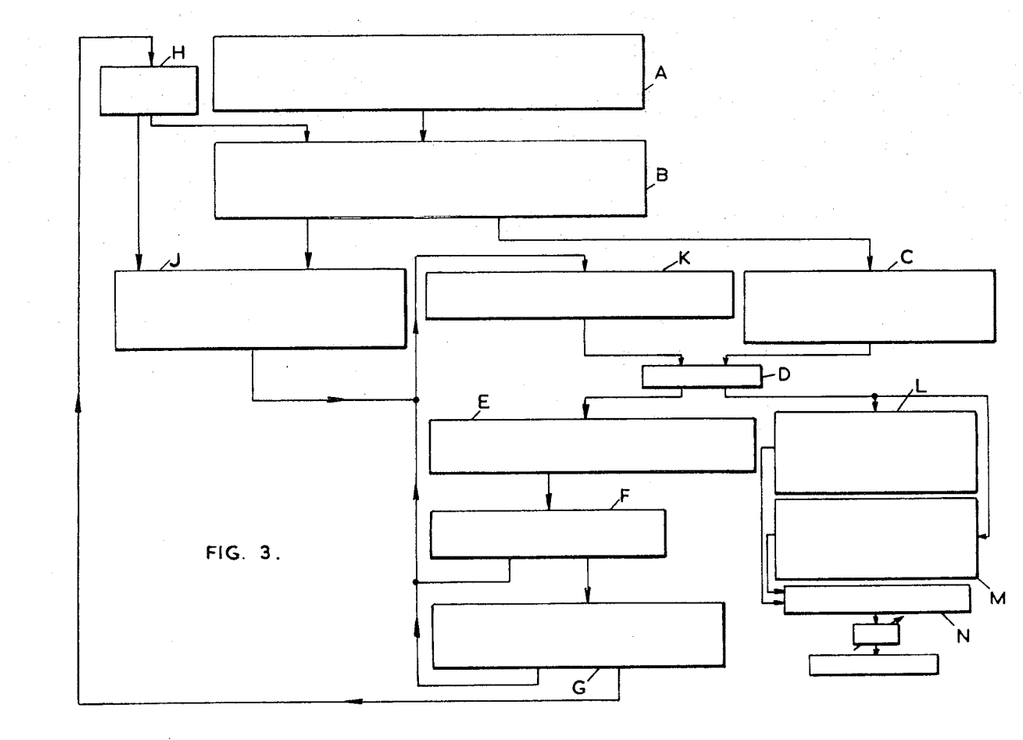
Figure 3A:
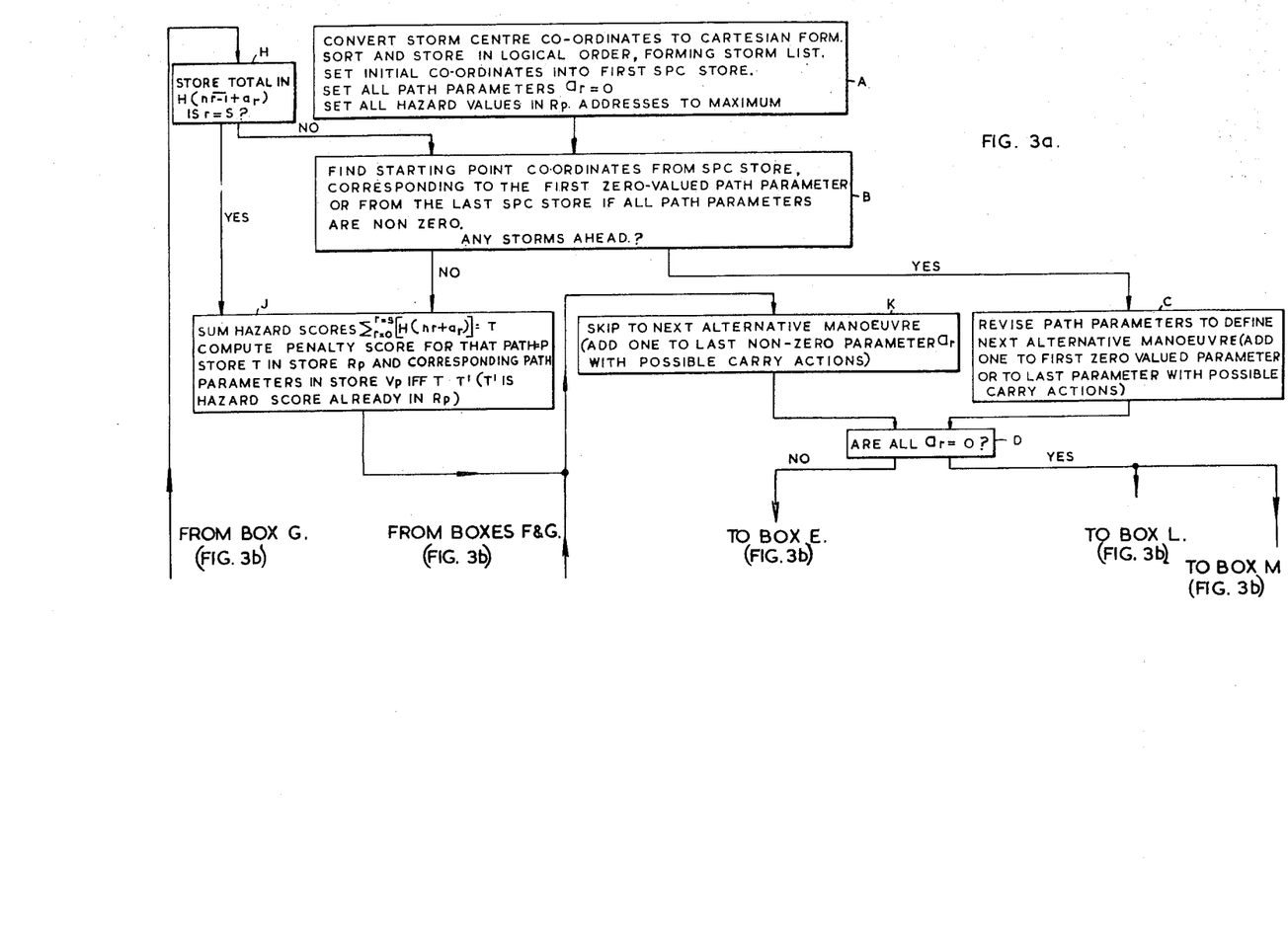
Figure 3B:
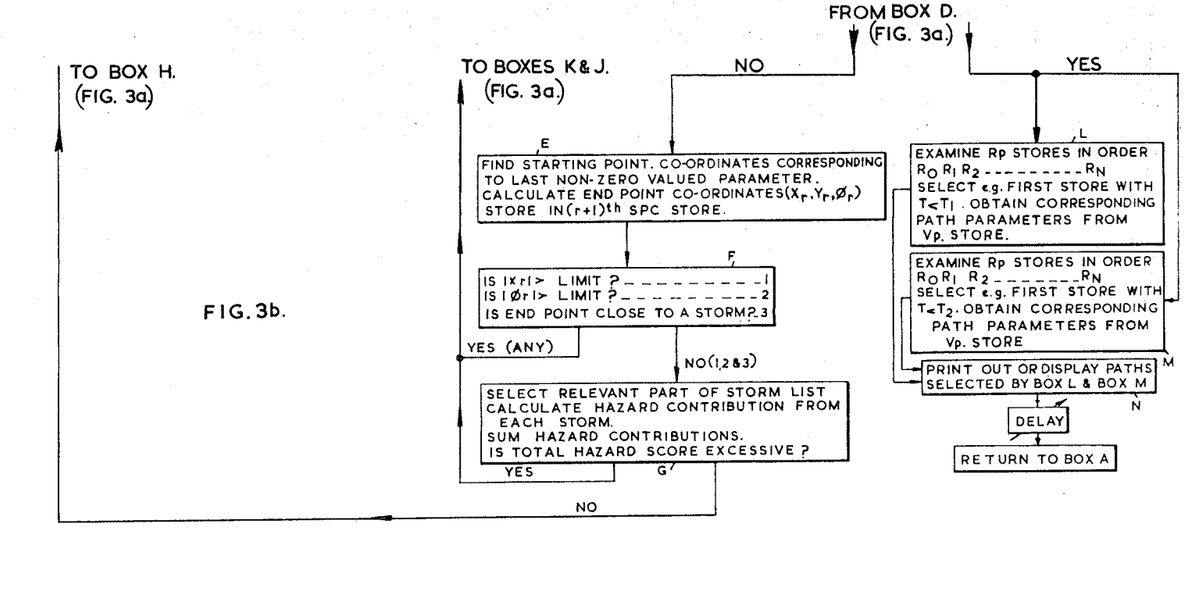

FIG. 3 (including FIGS. 3a and 3b) illustrates the search and decision process that enables the computer to select the most economical hazard-free path and the most economical acceptable risk path from the $n^s$ possible paths available. The various boxes, A, B, C, etc shown in FIG. 3 represent computer operations that will take place when a certain result is obtained from a previous operation. At the starting point of each segment of a path, there are three essential values which are relevant to the subsequent calculations, namely the x coordinate, the y coordinate, and the direction of the path at that point. The symbols $X_r$, $Y_r$ and $\phi_r$ will hereinafter be used to indicate the x, y and direction coordinates at the finish of the rth segment of a path under consideration. Analogously, the symbols $X_o$, $Y_o$ and $\phi_o$ will be used to indicate the initial position and heading of the aircraft, which is the starting point for the first segment of all the paths, at the start of each computer cycle. To make the following description equally applicable to the consideration of the second or any subsequent segment of a path, the coordinates of the starting point of the segment will be represented by $X_{r-1}$, $Y_{r-1}$ and $\phi_{r-1}$.

A set of store addresses, hereinafter referred to as the SPC stores, are allocated for storing the starting point coordinates of the segments of the path under consideration. Since at least several of the paths to be considered will probably have s segments, there are s SPC stores. The initial position coordinates $X_o$, $Y_o$, $\phi_o$ will be stored in the first SPC store. As hereinbefore indicated, the current values of the parameters $a_1, a_2, a_3 \ldots a_s$ will indicate the path and the path segment under consideration at any stage. The process hereinafter described will ensure that when the rth segment of any path is being considered, the first, second . . . rth SPC stores will hold the starting point coordinates of the first, second, . . . rth segments respectively of that path.

As hereinbefore described with reference to Box A, the storm center data is first converted and stored in a form suitable for the computer to use in the path selection process, and the parameters $a_r$ set to zero. In the first step of the process proper, indicated by box B in FIG. 3, the starting point coordinates $(X_{r-1}, Y_{r-1}, \phi_{r-1})$ of the segment to be considered are taken from the rth SPC store, where r is the ordinal number (suffix) of the first zero valued parameter in the set $a_1, a_2 \ldots a_s$. The set of storm center coordinates is then examined with reference to the starting point, to see if there are any storms within a predetermined distance of the most direct path from the starting point to the desired track; if there are none the most direct path will be chosen immediately and there will be no need to investigate the alternative possibilities; in this case the next operation is indicated by box J. If there are some storms in the area around the most direct path between the starting point and the desired track, the next operation is indicated by box C, where the computer revises the set of parameters $a_1, a_2 \ldots a_s$ to indicate the segment which is about to be investigated. To do this it adds one to the first zero-valued parameter of the set when examined in the order $a_1, a_2, a_3 \rightarrow a_2$ or if all the parameters have non-zero values, it adds one to the last parameter $a_s$. If this makes $a_s$ equal to $n + 1$, then it resets $a_s$ to zero and adds one to the preceding parameter $a_{s-1}$. If this makes $a_{s-1}$ equal to $n + 1$, it resets $a_{s-1}$ to zero and adds one to the preceding parameter; carry actions of this kind can continue back to $a_1$. When this process returns all the parameters to zero, all the paths have been considered. The computer uses this latter condition as indicated by Box D, to determine whether its next operation is to be as indicated by Box E or Box L.

When the set of parameters has been revised in this way, and assuming all the parameters $a_r$ are not zero, the position and value of the last non-zero parameter indicate the position of the segment and the manoeuvre under consideration for that segment. For instance, when $a_1, a_2 \ldots a_r$ have non-zero values and $a_{r+1} = a_{r+2} \ldots = a_s = 0$, the segment to be considered is the rth segment of an incomplete path defined by the successive manoeuvres indicated by $a_1, a_2 \ldots a_r$. To give a specific example, if the set of parameters was 2,3,1,0, the programme would be about to consider the effect of a 10° right bank ($a_3 = 1$) during the third segment of the path 23 on FIG. 2.

In the next operation (if the process is not finished), represented by box E, the coordinates of the starting point are taken from the SPC store corresponding to the last non zero path parameter of the revised parameters. These coordinates and the nature of the manoeuvre (indicated by the value of $a_r$) are used to calculate the coordinates $(X_r, Y_r, \phi_r)$ of the end point of the segment, according to the equations $$X_r = X_{r-1} + La_r (\sin \phi_{r-1} - \sin (\phi_{r-1} + \theta))$$

$$Y_r = Y_{r-1} + La_r (\cos (\phi_{r-1} + \theta) - \cos \phi_{r-1})$$

$$\phi_r = \phi_{r-1} + \theta$$

Where $\phi = K/La_r$, K is the segment length which as hereinbefore described is a fixed value for all manoeuvres in this example, and $La_r$ is the radius of turn of the manoeuvre currently under consideration for the rth segment, and these coordinates are stored in the $(r + 1)$th SPC store. Next, as indicated by box F, they are compared with prescribed arbitrary limits of maximum acceptable heading deviation (mod $\phi_r$ limit) and maximum acceptable lateral deviation (mod $X_r$ limit) and with the storm coordinate list. If the end point coordinates indicate an excessive deviation from the most direct route, or that the end point will be unacceptably close to a storm, the next action indicated by box K will be to change the path under consideration.

However if the end point is acceptable, ith respect to all three limit considerations the next operation will be as indicated by box G. In box G the computer selects from all the storm center coordinates those storms lying within a predetermined area around the segment under consideration, and computes the hazard contribution of each of the selected storms, to the hazard score for that segment. The hazard contribution is a number, calculated according to a predetermined function of the distance of approach of the segment to a selected storm center. The hazard contributions of all the selected storms are then summed to obtain a hazard score for the segment.

If this score exceeds a prescribed limit, the parameters $a_1 \ldots a_s$ are revised by the action represented in box K. This action which may be initiated by rejection of an unacceptable manoeuvre either in the action of box F or box G, adds one to the value of $a_r$ (the last non-zero parameter, which represents the manoeuvre resulting in the excessive hazard score). If this makes $a_r = n + 1$, it generates a carry action resetting $a_r$ to zero and adding one to the preceding parameter $a_{r-1}$, and similar carry actions may be propagated to earlier parameters as in the updating procedure in box C as hereinbefore described. This action effectively rejects the excessively hazardous manoeuvre and all further paths leading from it, and advances the selection process to a consideration of the next alternative, restarting the process at box E (unless, of course, the computer decides in box D that the process is then completed).

On the other hand, if the hazard score does not exceed the prescribed limit, the next operation is to store the hazard score as indicated in box H. There are $n\ s$ stores allocated for the storage of hazard scores during the path investigations; their contents are all reset to zero at the beginning of each computation cycle. Using the notation $H(p)$ to represent the address of the $p$th one of these stores, the hazard score obtained for the segment is stored in the address $H(n.\overline{r-1} + a_r)$. For example if the hazard score for the third segment of a path has just been calculated, it will be stored in the address $H(2n + a_3)$ where $a_3$ will have the value corresponding to the particular arc or manoeuvre which has been considered.

As indicated by box H the computer also examines the order of the current segment, that is the suffix $r$ of the last non-zero path parameter. If the segment was the $s$th segment, that is the last segment of a completed path, the next operation is as indicated by box J. If it is not the $s$th segment, the next operation is as indicated by box B again, where the computer takes as the next starting point coordinates for consideration those held in the $(r + 1)$th SPC store, which are $(X_r, Y_r, \phi_r)$, the coordinates of the end of the acceptable manoeuvre.

If the starting points of each successive segment have storms lying within a predetermined distance of the most direct path from them to the desired track and the manoeuvres considered for each segment in turn are acceptable and within the hazard limit, eventually an $s$th segment will be examined. After the hazard score associated with that particular $s$th segment has been put in the address $H(n.\overline{s-1} + a_s)$, in the operation representd by box H, the computer will examine the order of the current segment, and it will find it is an $s$th segment and the next operation will thus be as indicated by box J. In box J the hazard scores of each of the $s$ segments of that complete path are summed. Since, in the operation represented by box C or box K the computer has been updating the values of $a_1, a_2 \ldots a_s$ to correspond to the choice of manoeuvre for the first segment, choice of manoeuvre for the second segment . . . choice of manoeuvre for the $s$th segment, respectively, the completed path is fully defined by the current values of $a_1, a_2 \ldots a_s$. The addresses of the hazard scores associated with each segment of the path defined are thus easily obtained. The value of $a_1$ stored in the computer is the value of $a_r$ in the address of the hazard score associated with the first segment. The value of $a_2$ is the value of $a_r$ in the address of the hazard score associated with the second segment and so on. For the first segment $\overline{r-1} = 0$. For the second segment $\overline{r-1} = 1$ and so on. Hence from (1) above the address of the hazard score associated with the first segment is, $$H(a_1)$$

the address of the hazard score associated with the second segment is, $$H(n \times 1 + a_2)$$

and so on. Thus, by summing the hazard scores stored in the addresses associated with all the segments defining the path a total hazard score T for that path is found, which will be an integer in the range O to N; thus $$T = (H(a_1)) + (H(n + a_2)) + (H(2n + a_3)) + \ldots + (H(\overline{s-1}.n + a_s))$$

where $(H(a_1))$ indicates the contents of the store $H(a_1)$.

The operation in box J may alternatively be initiated when the action of box B finds that there are not further storms ahead of the starting point co-ordinates under consideration, that is when the path segments already considered though fewer than $s$ will suffice to take the aircraft past all of the storms. In this caee the summation required to derive the total hazard score will clearly be shortened to $r$ terms.

The penalty score P associated with the completed path is then computed in a prescribed manner to form an indication of any economic disadvantages of the path. For instance the penalty score may be directly proportional to the length of any detour involved. P is an integral number within the limits O to N, and the greater the value of P the greater the associated penalty it represents.

In the computer a set of stores R is allocated for storing the total hazards associated with fully investigated paths and a set of stores V is allocated for storing the path parameters associated with these total hazards. The integral value of P associated with any path is used as a store identification suffix to he stores R and V. Thus there are $(N + 1)$, Rp stores and $(N + 1)$, Vp stores. As indicated by Box J the total hazard score T for any potentially useful path having a penalty score P will be compared with the total hazard score previously entered in the store Rp; if and only if the score T is less than any score previously entered in the store Rp, T will be entered in Rp replacing its previous contents. When this occurs the path parameters associated with the relevant path will then be entered in the corresponding Vp store, replacing any previous contents of the Vp store. This process eliminates some less advantageous paths from further consideration. At the start of a computation cycle, an intolerably high hazard score value is inserted in each of the relevant R stores. The comparison with T and any consequent entries in the Rp and Vp stores will complete the action in respect of that particular path for the time being, and the programme goes into the operation of box K again to start the consideration of the next alternative path.

When all the paths have been considered, box D will be reached with all the path parameters returned to zero. At this stage the total hazard scores and path parameters for the most advantageous paths will have been entered into the appropriate Rp and Vp stores. As indicated in box L, and box M, the programme then examines the contents of the Rp stores in the sequence, $R_o, R_1, R_2 \ldots R_N$ thereby considering the acceptable paths in order of increasing penalties. It can print out or display the values of P and T for the first Rp store found to contain a total hazard score T which is less than a prescribed value $T_1$, and the values of P and T for the first Rp store found to contain a total hazard score T less than a second prescribed value $T_2$ lower than $T_1$. Alternatively or additionally it can form another list comprising the values of P and T for each path which is found to have a total hazard score less than the least of the total hazard scores found earlier in the sequence of consideration of the Rp stores (which will relate to paths with lesser penalty scores). This process eliminates some paths which would involve a greater economic penalty without gaining a reduction in hazard score, and retains details of a selection of advantageous paths. The path parameters $a_1 \ldots a_s$ associated with any hazard selected from an Rp store are obtained from the orresponding Vp store and are simultaneously printed out or displayed with the P and T values. The storm pattern and the selected paths can then be displayed with their scores P and T on the display 13. The scores P and T for each selected path can be summed, and the path having the least value of (P + T) can be particularly identified.

The computation of the penalty score indicated in box J makes an allowance for incomplete paths, that is to say paths that have at least one zero-valued path parameter. Such incomplete paths can be subjected to the operation indicated by box J whenever it is found that the starting point co-ordinates of a segment of order less than $s$, is found to have no storms ahead of it in the operation as indicated in box B. Such paths, and paths ending off the desired track as hereinbefore described with reference to FIG. 2, will require to be completed by a further probably S-shaped path leading in a convenient and practical manner back to the desired track. While such further paths may, for the purpose of completing the penalty score calculations, be assumed to be hazard free, they may involve additional penalty score contributions which may be included in the penalty computation indicated in box J.

Figure 4:
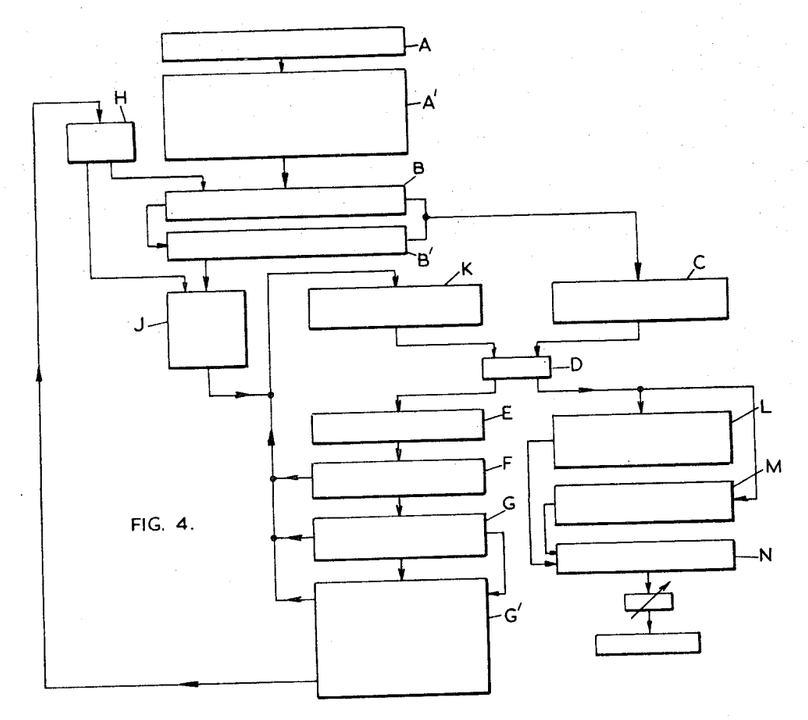
Figure 4A:
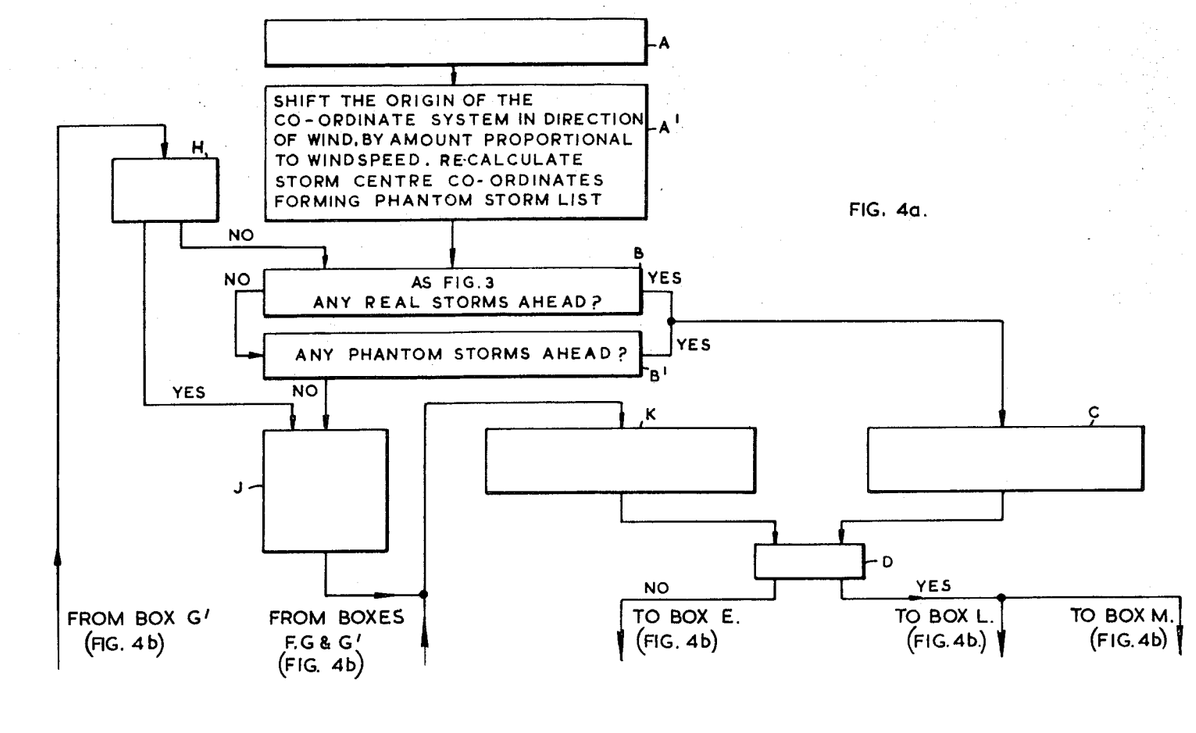
Figure 4B:
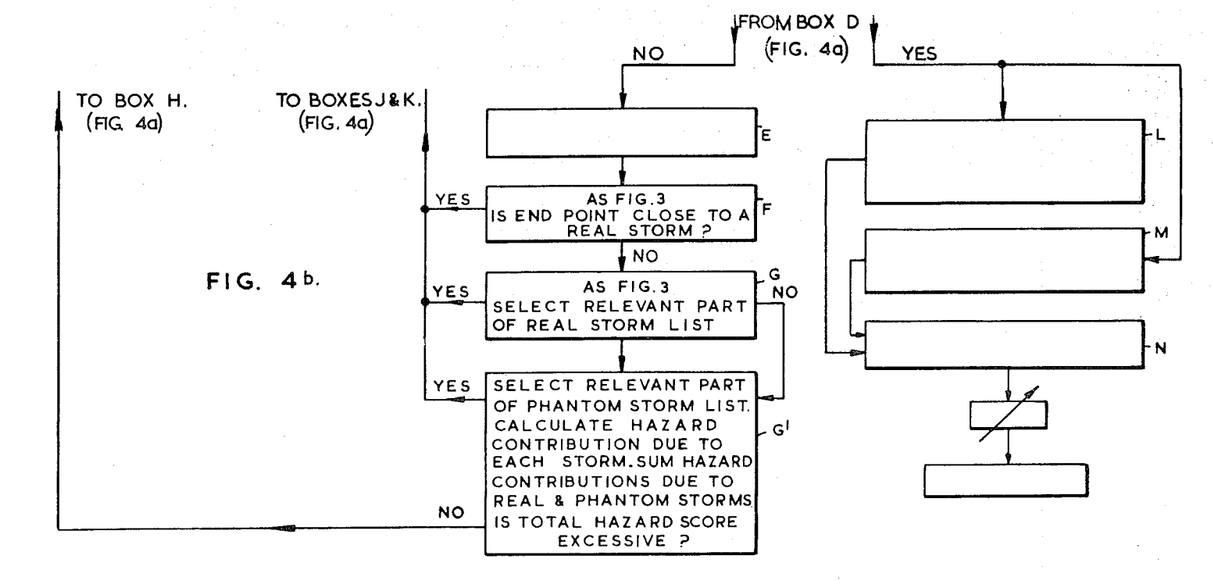

In FIG. 4 (including FIGS. 4a and 4b) the flow chart of FIG. 3 has been expanded to show one way in which the effect of the wind speed and direction on the storms under consideration can be taken into account when computing the hazard scores for the various paths in a preferred form of the process described hereinabove. For brevity the description of the operation indicated by a particular box has been omitted in FIG. 4 where that box and its operation are common to the modes of operation shown by both FIG. 3 and FIG. 4.

As indicated by box $A^1$ the coordinates of each storm in the storm list as compiled in the operation of box A are modified, effectively by a shift of origin of the coordinate system in the wind direction by an amount proportional to the wind speed. A second storm list is thus compiled, representing expected areas of turbulence downwind from the storm centers indicated by the weather radar. This second storm list is hereinafter called the phantom storm list to distinguish it from the list of real storm centers.

As indicated by box $B^1$ and $G^1$, the operations carried out by the computer with respect to the phantom storm list are similar to those carried out with respect to the real storm centers indicated by boxes B and G respectively. For any starting point considered in box B, the computer determines whether there are any real storms between that point and the desired track, and if there are none in box $B^1$ it makes a similar determination with respect to the phantom storms. If there are no storms ahead as determined by box B and box $B^1$, the next operation is as described hereinabove with reference to box J. If either box B or box $B^1$ operations indicate storms ahead then the next operation is as described hereinabove with reference to box C.

Similarly if a particular choice of manoeuvre under consideration for a particular segment does not exceed the limits as defined by the operation indicated in box F with respect to an unacceptable detour or a hazardous final approach to a storm, then the next operation as described hereinabove is as indicated by box G. Here the relevant part of the real storm list is selected and the hazard contribution to that manoeuvre by each of the selected real storms is computed and summed. If the total hazard score for that manoeuvre is not excessive a similar operation is carried out with respect to the phantom storm list, as indicated by box $G^1$. However, the hazard contribution summation operation in box $G^1$ includes any total hazard contribution previously computed in box G with respect to the real storms selected. If the total hazard contribution of both real and phantom storms to that particular manoeuvre is still not excessive, the next operation is as described hereinabove with respect to box H. If the total hazard contribution of either the real storms or the real storms and the phantom storms is excessive then the next operation is as described hereinabove with respect to box K.

In the modified computer operation shown in FIG. 4, the hazard contribution at any point in a proposed path due to a phantom storm a given distance from that point need not necessarily be arranged to equal the hazard contribution at that same point due to a real storm at the same distance. Preferably the hazard contribution as a function of distance from a phantom storm is arranged to give predetermined lower hazard contributions at all points than the corresponding hazard contributions due to a real storm, to reflect the estimated decay of the storm intensity in the downwind direction.

Many variations of the path selection process will suggest themselves to a skilled computer programmer. For example all n alternative manoeuvres for the first segment might be examined before proceeding to the second segment alternatives and so on, or alternatively the manoeuvres for each segment leading to the least devious path might be examined first followed by an examination of paths of increasing diversion from the desired route.

The time interval between the input of successive sets of signals representing the locations of storm centers at a given instant of time, may be controlled by a timing circuit which might form part of the computer 8. This time interval may be chosen to allow sufficient time for the computer 8 to complete and plot out the various selected paths through the previous set of storm centers, or it may be chosen to allow the aircraft sufficient time to fly one or more of the segments computed before presenting the pilot with more flight path information.

The height and elevation of storm centers might be further factors in determining the hazard value to be assigned to each storm center. The hazard value associated with each storm center might also be partly determined by the intensity of the received signal representing that storm or the distance that a given path under examination travels through an area of given storm intensity.

It is emphasized that FIGS. 3 and 4 illustrate only one possible sequence of computer programme operations suitable for selecting the desired paths. Clearly there will be many possible variations of the actual programme devised, due to (a) variations in the skill of individual programmers, (b) the variety of types of computer for which the programme is to be written and (c) the different applications to which the path selection is to be applied, for example in a ship borne application the hazard law would be different since the relative speeds and proximity to other ships land masses etc (the "hazards" to the ship) will be different from the hazards in an air borne application.

In an airborne application the computer might conveniently be a part of the Flight Management Computer conventionally installed in many aircraft, or it might form part of the Navigational Computer and share the total computation time available to that computer.

If there are legal or political restrictions on the flight path, they can be taken into account by adding to the storm list a set of imaginary storms disposed along the boundary of the forbidden area. Clearly the system could also be developed to take account of other hazards, such as other aircraft for instance.

I claim:

1. Navigational apparatus for use in a moving vehicle, comprising a hazard indicating means for providing signals representing the location of hazards with respect to the position of said hazard indicating means, said hazard indicating means being operative to provide signals representing the locations of a plurality of hazards, and computer means connected to receive the said signals from the hazard indicating means and programmed for the computation of parameters which define at least one distinct path substantially avoiding said plurality of hazards, said computer means including means for providing signal outputs representing the computed parameters.

2. Navigational apparatus as claimed in claim 1 wherein the hazard indicating means includes a weather radar means for locating storm centers.

3. Navigational apparatus as claimed in claim 1 wherein the computer means is programmed to provide program steps operative to consider a plurality of possible paths in sequence, the program including steps for rejecting any pathe found to involve more than a predetermined measure of risk, and the program also including program steps for calculating hazard scores and penalty scores for the paths not rejected.

4. Navigational apparatus as claimed in claim 3 wherein the computer means is programmed to provide program steps which select and indicate the parameters of paths having the lowest penalty scores associated with various acceptable hazard scores.

5. Navigational apparatus as claimed in claim 1 wherein the computer means is programmed to provide program steps operative to consider paths which are composed of arcuate segments of equal length, wherein consecutive ones of said segments have a common tangent at their junction, wherein the radii of the arcuate segments are chosen from a plurality of predetermined radii, and wherein each path is represented by a set of parameters indicating the radii of its arcuate segments.

6. Navigational apparatus as claimed in claim 1 including visual display means connected to the computer means for displaying a map-like representation of the location of the hazards, said display means being operative to also display at least one path avoiding the hazards.

7. Navigational apparatus as claimed in claim 3 wherein said computer means is programmed to provide steps operative to calculate a hazard score for each unrejected path by summing contributions comprising a contribution for each hazard which is detected by said hazard indicating means, said programmed computer being operative to calculate each contribution as a predetermined function of the nearest distance from a hazard to a point on the path being considered.

8. Navigational apparatus as claimed in claim 2 wherein the computer is programmed to provide program steps which make an allowance for the effect of the prevailing wind on the distribution of turbulence associated with each storm center by deriving a list of notional storm centers having locations downwind from the actual storm centers, said programmed computer being operative to treat said notional storm centers as additional hazards.

* * * * *